United States Patent
Auer et al.

(10) Patent No.: US 7,662,358 B2
(45) Date of Patent: Feb. 16, 2010

(54) FINE-PARTICLED ALKALINE-EARTH TITANATES AND METHOD FOR THE PRODUCTION THEREOF USING TITAN OXIDE PARTICLES

(75) Inventors: Gerhard Auer, Krefeld (DE); Werner Schuy, Tonisvorst (DE); Anna Röttger, Krefeld (DE); Dieter Völtzke, Weissenborn (DE); Harald Schwarz, Leiozing (DE); Hans-Peter Abicht, Halle (DE)

(73) Assignee: Tronox Pigments GmbH, Krefeld (DE)

( * ) Notice: Subject to any disclaimer, the term of this patent is extended or adjusted under 35 U.S.C. 154(b) by 0 days.

(21) Appl. No.: 11/662,836

(22) PCT Filed: Sep. 14, 2005

(86) PCT No.: PCT/EP2005/009868

§ 371 (c)(1),
(2), (4) Date: Jan. 30, 2008

(87) PCT Pub. No.: WO2006/029834

PCT Pub. Date: Mar. 23, 2006

(65) Prior Publication Data

US 2008/0131355 A1 Jun. 5, 2008

(30) Foreign Application Priority Data

Sep. 14, 2004 (EP) .................................. 04021822

(51) Int. Cl.
*C01G 23/04* (2006.01)
*C01G 23/047* (2006.01)
*C01F 11/02* (2006.01)
*C01G 33/00* (2006.01)

(52) U.S. Cl. ........................ 423/598; 423/636; 502/525

(58) Field of Classification Search .................. 423/598, 423/636; 502/525
See application file for complete search history.

(56) References Cited

U.S. PATENT DOCUMENTS

| | | | | |
|---|---|---|---|---|
| 4,724,038 | A | * | 2/1988 | Pastor et al. ................... 117/36 |
| 4,829,033 | A | * | 5/1989 | Menashi et al. .............. 501/139 |
| 5,091,348 | A | * | 2/1992 | Woodhead et al. .......... 501/136 |
| 6,126,743 | A | * | 10/2000 | Saegusa et al. ................ 117/68 |
| 6,485,701 | B2 | * | 11/2002 | Miyoshi .................. 423/594.9 |
| 2004/0028601 | A1 | * | 2/2004 | Torii et al. ................... 423/598 |

OTHER PUBLICATIONS

Scott et al., "Concise Encyclopedia chemistry." Walter de Gruyten (1994), p. 116.*
CRC Handbook of Chemistry & Physics, 89th Ed. (2008-2009), p. 4-50.*

* cited by examiner

*Primary Examiner*—Timothy C Vanoy
*Assistant Examiner*—Daniel Berns
(74) *Attorney, Agent, or Firm*—Monahan & Moses, LLC; Timothy J. Monahan

(57) ABSTRACT

The invention relates to fine-particled alkaline-earth titanates and to a method for the production thereof by reacting alkaline-earth metal compounds with titanium dioxide particles. The titanium dioxide particles have a BET-surface greater than 50 m2/g. The titanium dioxide particles can have a very low sulphate, chloride and carbon content. The reaction can take place at a temperature below 700° C. The alkaline-earth titanate can have a BET-surface of 5-100 m2/g. Advantageously, it does not contain any hydroxyl groups in the crystal lattice. The alkaline-earth titanate can be used in the production of microelectronic components.

19 Claims, 4 Drawing Sheets

Barium titanate from titanium oxide hydrate (BET: 271 m$^2$/g) and Ba(OH)$_2$ (calcined at 400° C)

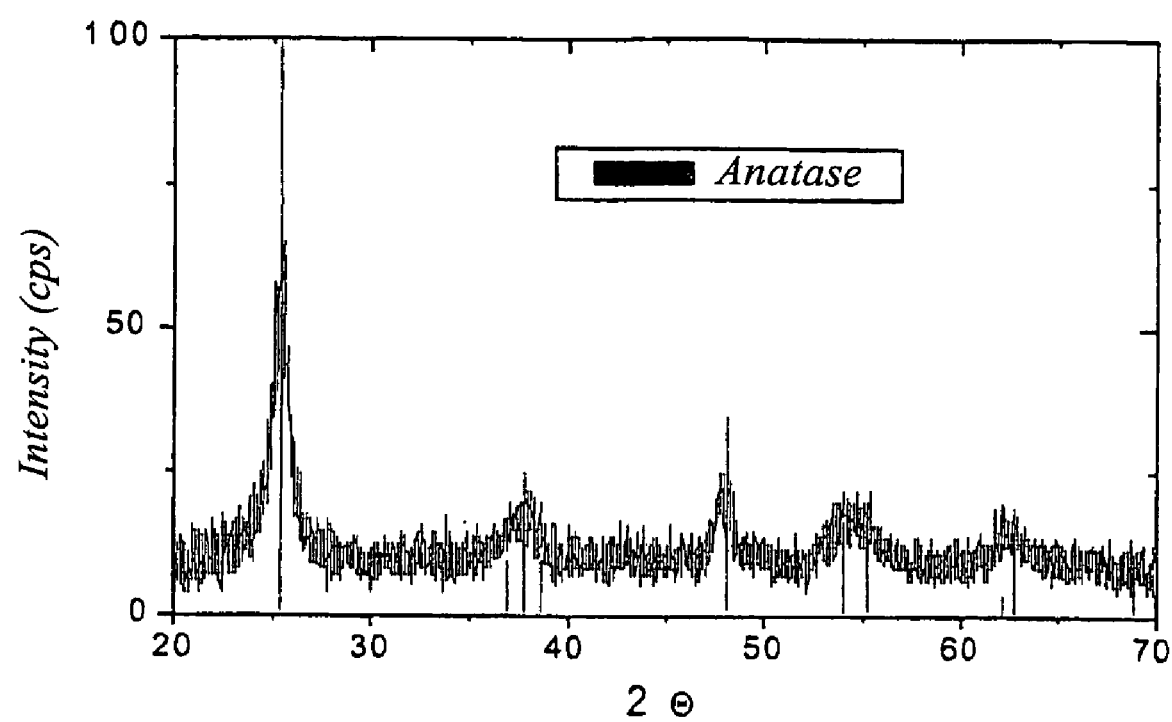
Fig. 1: X-ray diffractogram of titanium oxide hydrate

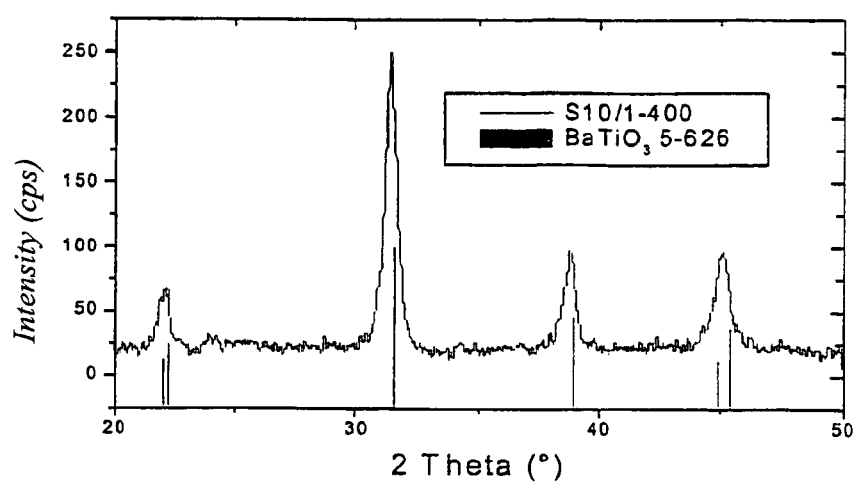
Fig. 2: Barium titanate from titanium oxide hydrate (BET: 271 m²/g) and Ba(OH)$_2$ (calcined at 400° C)

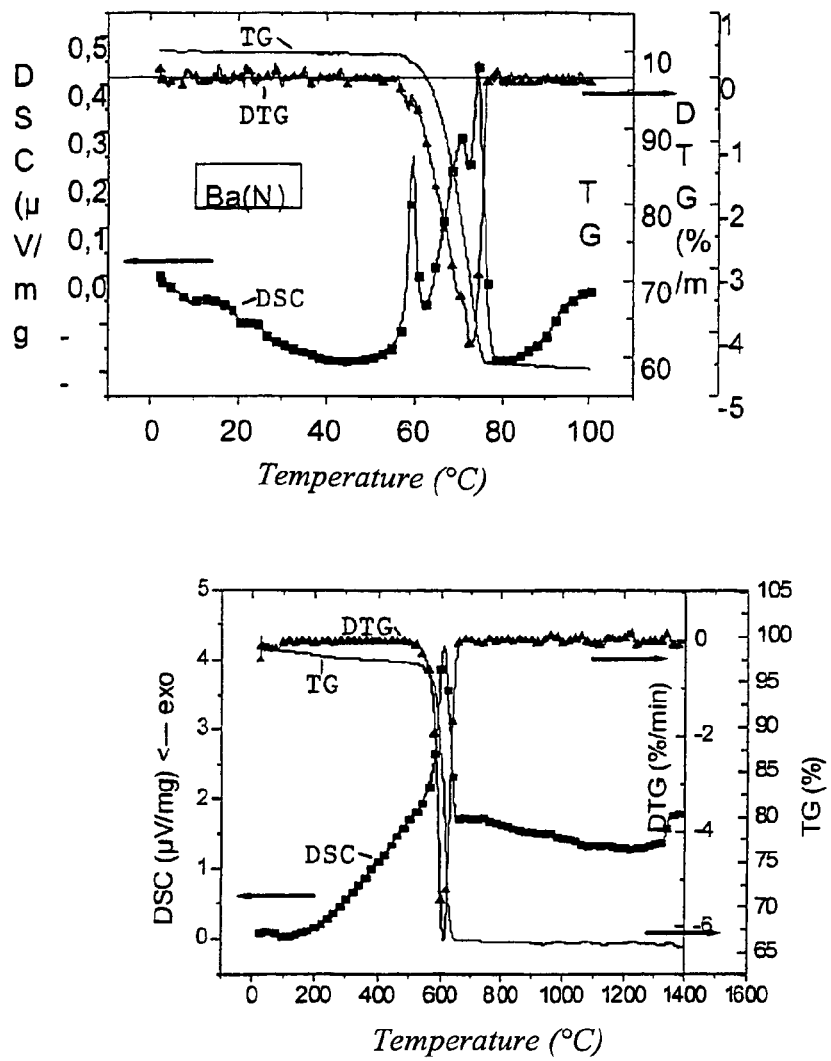
Fig. 3: Thermal analysis (DSC – differential scanning calorimetry, TG – thermogravimetry, DTG – differential TG) of the starting material $Ba(NO_3)_2$ (top) and of the mixture with titanium oxide hydrate (bottom)

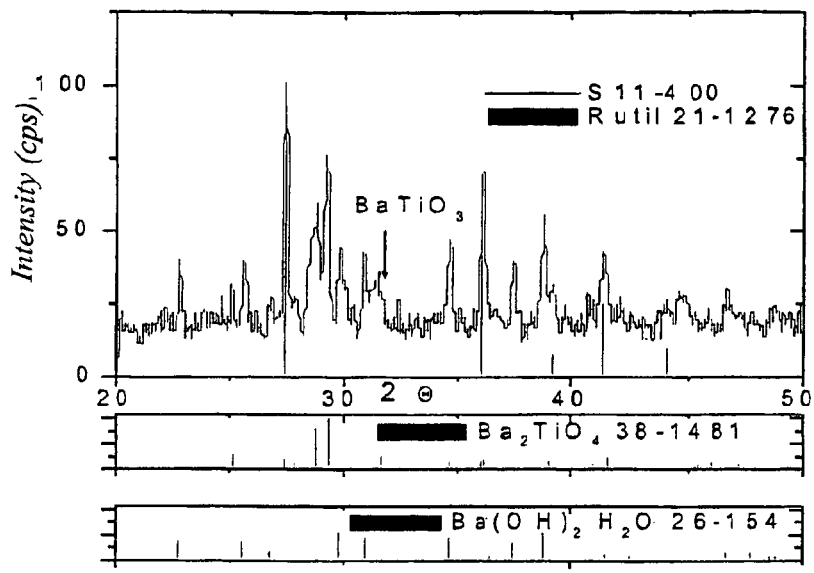
Fig. 4: Barium titanate from titanium oxide (BET: 6 m²/g) and Ba(OH)₂ (calcined at 400° C)
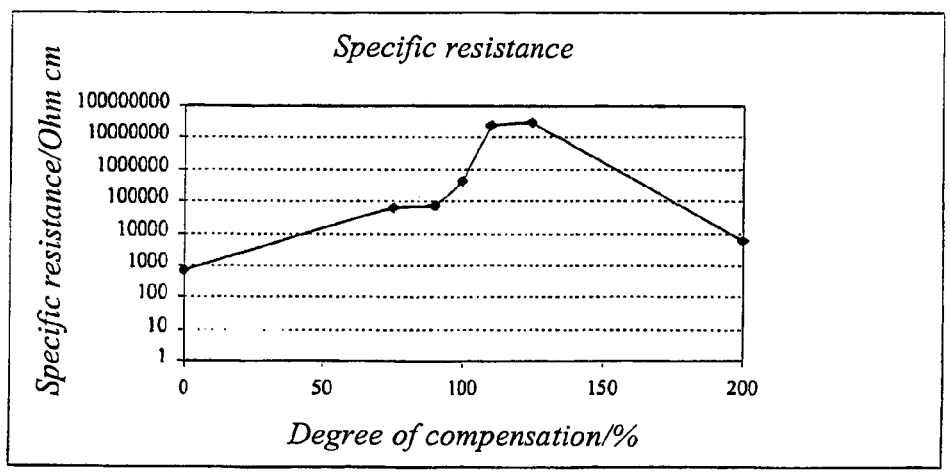
Fig. 5: Specific resistance of $BaTiO_3$ ceramics sintered at 1400° C with varying degree of compensation of the Nb with Al ically,
FINE-PARTICLED ALKALINE-EARTH TITANATES AND METHOD FOR THE PRODUCTION THEREOF USING TITAN OXIDE PARTICLES The invention relates to fine-particle alkaline-earth titanates and a method for the production thereof by reacting alkaline-earth metal compounds with titanium dioxide particles. The invention further relates to a micro-electronic component which contains an alkaline-earth titanate.

PRIOR ART

Due to their outstanding dielectric properties, alkaline-earth titanates, particularly $BaTiO_3$, are suitable for the manufacture of micro-electronic components, such as multi-layer ceramic capacitors (MLCC).

Alkaline-earth titanates may be produced by synthesis methods which take place by way of solid state reactions and by wet chemical methods.

Hennings (J. Am. Ceram. Soc. 84 (2001)2777-2782) describes a solid state reaction for producing $BaTiO_3$ from $TiO_2$ with a particle size of 200 nm by calcination with $BaCO_3$ at 900 to 1200° C. The $BaTiO_3$ produced in this manner is, however, highly agglomerated with crystallite sizes of 200 nm to 1 µm and must be disintegrated by milling.

From studies on the formation mechanism by way of solid state reactions (A. Beauger, J. C. Mutin, J. C. Niepce, J. Mater Sci. 18 (1983), 3543-3550; J. C. Niepce, G. Thomas, Solid State Ionics 43 (1990) 69-76; D. F. Hennings, B. S. Schreinemacher, H. Schreinemacher, J. Am. Ceram. Soc. 84 (2001) 2777-2782) it is known that the formation reaction takes place mainly by diffusion of $Ba^{2+}$ and $O^{2-}$ ions into the $TiO_2$ particles, i.e. the morphology of the $BaTiO_3$ particles is determined primarily by the morphology of the $TiO_2$ particles. On the other hand, the barium and oxide ions must be present at such temperatures that enable diffusion on one hand but which on the other hand only permit crystal growth processes of the $TiO_2$ and $BaTiO_3$ particles to a very small extent.

DE 3635532 (D. Hennings, H. Schreinemacher) discloses a wet chemical process for producing $BaTiO_3$ by co-precipitation of barium and titanium compounds and subsequent calcination. This method is very time-consuming and expensive as is the hydrothermal production of $BaTiO_3$ from $Ba(OH)_2$ or soluble Ba compounds and $TiO_2$ using mineralisers, e.g. KOH, NaOH, (J. H. Lee, H. H. Nersiyan, C. W. Won, J. Mater Sci. 39 (2004)1397-1401, J. Moon, J. A. Kerchner, H. Karup, J. H. Adair. J. Mater Res. 14 (1999) 425-435).

The reaction of barium hydroxide with fine-particle titanium dioxide is described in US2004/0028601 A1. In this case, the barium hydroxide octahydrate is first melted, whereby a highly concentrated aqueous solution of barium ions is formed, which is then reacted with titanium dioxide. In this case it is not, therefore, a solid state reaction. The cubic $BaTiO_3$ formed in the process must thus be converted by calcination into the tetragonal modification in a subsequent step.

SUMMARY OF THE INVENTION

Against the background of this prior art, it is the object of the present invention to provide fine-particle, high-purity and economically producible alkaline-earth titanates in addition to a method for the production thereof using simple substrates containing titanium.

This object is achieved on one hand by a method for the production of alkaline-earth titanates by reacting alkaline-earth metal compounds with titanium dioxide particles with a BET surface area greater than 50 $m^2/g$ in a solid state reaction, whereby the reaction takes place at temperatures below 700° C.

On the other hand, the object is achieved by a method for the production of alkaline-earth titanates by reacting alkaline-earth metal compounds with titanium dioxide particles with a BET surface area greater than 50 $m^2/g$, whereby the titanium oxide particles have a sulphate content <1.5 weight %, a chloride content of <1000 ppm and a carbon content of <1000 ppm.

The object is further achieved by the provision of an alkaline-earth titanate which is producible by means of the method according to the invention. The alkaline-earth titanate may have a BET surface area of 5 to 100 $m^2/g$ and no hydroxyl groups built into the crystal lattice.

The invention additionally covers the provision of a micro-electronic component comprising an alkaline-earth titanate according to the invention.

FIGURES

FIG. 1: X-ray diffractogram of titanium oxide hydrate (BET: 271 $m^2/g$)

FIG. 2: X-ray diffractogram of barium titanate from titanium oxide hydrate (BET: 271 $m^2/g$) and $Ba(OH)_2$ (calcined at 400° C.)

FIG. 3: Thermal analysis (DSC—differential scanning calorimetry, TG—thermogravimetry, DTG—differential thermogravimetry) of the starting material $Ba(NO_3)_2$ (top) and of the mixture with titanium oxide hydrate (bottom).

FIG. 4: X-ray diffractogram of the product from coarser titanium oxide (BET: 6 $m^2/g$) and $Ba(OH)_2$ (calcined at 400° C.).

FIG. 5: Specific resistance of $BaTiO_3$ ceramics, sintered at 1400° C., with varying degree of compensation of the Nb with Al.

DETAILED DESCRIPTION OF THE INVENTION

1.1 The Titanium Dioxide Particles

The titanium dioxide particles used according to the invention have a BET surface area greater than 50 $m^2/g$, preferably less than 450 $m^2/g$, in particular preferably 200 to 380 $m^2/g$, in particular preferably 250 to 350 $m^2/g$. In this regard, determination of the BET surface area is in accordance with DIN ISO 9277 by means of $N_2$ at 77 K on a sample of the titanium dioxide particles outgassed and dried for 1 hour at 140° C. The evaluation is carried out by way of multi-point determination (10-point determination).

The titanium dioxide particles used according to the invention are regularly titanium oxide hydrate particles, i.e. the particles contain chemisorbed water and if necessary $H_2SO_4$ and/or other inorganic and/or organic components.

Preferably the titanium dioxide particles contain 0.4 to 25 weight % water, in particular preferably 2 to 10 weight % water.

The $H_2SO_4$ content of the titanium dioxide particles is preferably less than 1.5 weight %, more preferably less than 1.0 weight %, even more preferably less than 0.4 weight %, in particular preferably between 0.01 to 0.3 weight %, in particular preferably between 0.01 to 0.08 weight %, in relation to $TiO_2$ in each case.

The weight percentage details of the titanium dioxide's material contents shown here and listed in the following relate to a sample dried according to ISO 787 Part 2.

Determination of the $H_2O$ content of the titanium dioxide particles may be carried out according to the following equation:

$$H_2O \text{ content (\%)} = \text{annealing loss (\%)} - H_2SO_4 \text{ content (\%)}$$

In this case the annealing loss is the weight loss of a sample dried according to ISO 787 Part 2 after annealing for one hour at a temperature of 1000° C. The $H_2SO_4$ content is determined on the basis of the analytical determination of the sulphur content of the sample dried according to ISO 787 Part 2. Determination of the sulphur content takes place by combustion and gas chromatographic detection of the combustion gases by means of thermal conductivity detection (TCD).

By approximation, it is also possible to equate the $H_2O$ content of the titanium dioxide particles with the annealing loss after annealing for one hour at 500° C. of the sample dried according to ISO 787 Part 2.

Precise determination of the $H_2O$ content of the titanium dioxide particles may be carried out, for example, by gas chromatographic analysis of the volatile constituents which are formed after annealing for one hour at a temperature of 1000° C. of a sample dried according to ISO 787 Part 2.

Preferably the carbon content of the titanium dioxide particles is less than 1000 ppm, in particular preferably less than 500 ppm, in particular preferably less than 50 ppm, in relation to $TiO_2$. Determination of the carbon content is carried out by combustion and gas chromatographic detection of the combustion gases by means of thermal conductivity detection (TCD).

The halide content of the titanium dioxide particles used according to the invention is preferably less than 1000 ppm, in particular preferably less than 500 ppm, in particular preferably less than 50 ppm, in relation to $TiO_2$. In particular the chloride content of the particles is preferably less than 1000 ppm, in particular less than 200 ppm, even more preferably less than 100 ppm, in particular preferably less than 20 ppm, in relation to $TiO_2$.

The niobium content in the titanium dioxide particles may be less than 2000 ppm, preferably 10 to 1000 ppm, preferably 30 to 1000 ppm, in particular 50 to 100 ppm, in relation to $TiO_2$.

The sodium and/or potassium content in the titanium dioxide particles used according to the invention is preferably less than 200 ppm, in relation to $TiO_2$.

The iron content of the titanium dioxide particles used according to the invention is preferably less than 100 ppm, even more preferably less than 30 ppm, in particular preferably less than 10 ppm, in relation to $TiO_2$.

The titanium oxide particles used according to the invention may be obtained by hydrolysis of inorganic or organic titanium compounds. Depending on the titanium compound and the reaction conditions, the titanium dioxides obtained in the process have different properties.

It is possible to produce the titanium oxide particles used according to the invention in good quality and cost-effectively by hydrolysing titanyl sulphate solution. It is also possible, however, to produce the titanium oxide hydrate particles from titanium tetrachloride or titanium alkoxide.

In the case of titanium oxide hydrate, which is obtained by hydrolysing titanyl sulphate solution, there is a particularly advantageous combination of properties, that is to say a high specific surface area and a microcrystalline anatase structure. This anatase structure may be identified as microcrystalline material due to the broad reflexes of the X-ray diffractogram (see FIG. 1).

Preferably, the particles used according to the invention thus contain less than 10 weight %, in particular preferably less than 1 weight %, rutile in relation to $TiO_2$. Particularly preferable are titanium dioxide particles which clearly exhibit an anatase structure in the X-ray diffractogram.

The titanium oxide hydrate particles may, for example, be obtained by hydrolysis of a titanyl sulphate solution containing sulphuric acid. Depending on the origin and composition of the titanyl sulphate solution containing sulphuric acid, on hydrolysis a sulphuric acid suspension of titanium oxide hydrate is obtained, which may still contain undesirable contaminants, in particular heavy metals. Generally speaking, one or a plurality of purification steps are, therefore, carried out to free the titanium oxide hydrate of undesirable contaminants.

Preferably titanium oxide hydrate particles, which are formed by hydrolysing titanyl sulphate that is generated in the production process for titanium dioxide according to the sulphate method, are used. This process is described, for example, in Industrial Inorganic Pigments 3$^{rd}$ edition, published by Gunter Buxbaum, Gerhard Pfaff, Wiley-VCH, Weinheim 2005.

Particularly preferred, the titanium oxide hydrate obtained after hydrolysis is freed from adherent contaminants by filtering and washing it and, if necessary, by subjecting it additionally to the process step, known as bleaching, of a chemical treatment with reduction agents to eliminate trivalent iron.

Aluminium (powder), titanium hydride or sodium hydroxymethane sulphinate dihydrate (trade name: Brüggolith®) are suitable, for example, as reduction agents for the bleach.

Commercial production of titanium oxide hydrate based on the sulphate method for the production of titanium dioxide also has the advantage of consistent product quality and continuous availability.

In order to obtain a particularly high level of purity, it is advantageous to use not the commercial titanyl sulphate solution containing metal ions and sulphuric acid but a titanyl sulphate solution containing synthetic sulphuric acid which only contains small amounts of contaminants. Such a titanyl sulphate solution may, for example, be produced by hydrolysing high-purity $TiCl_4$ or titanium esters and by dissolving the precipitate obtained with sulphuric acid. The production of a high-purity titanium oxide hydrate from this may take place either analogously with conventional commercial processes or with specific deviations.

The adherent sulphuric acid is preferably removed by reaction with a base (e.g. NaOH, KOH, $NH_3$) and subsequent washing out of the sulphate formed. If necessary, it is possible to arrange for subsequent elimination of the cations introduced due to reaction with the base by reacting them with acids (e.g. carbonic acids or nitric acid) that are thermally easily decomposable and by subsequent washing out.

The reactions described above may be repeated several times depending on the purity desired.

Of particular advantage with the titanium oxide hydrate obtained from titanyl sulphate is its high purity in respect of iron, aluminium and other metals as well as its extremely low contents of chloride and carbon.

It may be advantageous to treat the titanium dioxide particles by means of a calcination or tempering step in order to modify the particle size and reactivity in a specific manner. The conversion of microcrystalline titanium oxide hydrate into somewhat larger anatase crystallites may be particularly advantageous. In this regard, the calcination or tempering step should, however, be carried out such that the particular properties of the titanium oxide hydrate are not lost, i.e. the proportion of chemisorbed water (e.g. in the form of hydroxyl groups) should not become less than 0.4 weight %, preferably 2.0 weight %, in order to obtain a titanium oxide hydrate which is as reactive as possible.

With titanium oxide hydrate calcined at high temperatures, the reactivity drops significantly whilst the titanium oxide hydrate transforms into macrocrystalline $TiO_2$ with a crystal size greater than 100 nm in the anatase or rutile modification with a content of chemisorbed water less than 0.4 weight %. Furthermore, as already mentioned, coarser titaniferous particles induce the formation of a coarser alkaline-earth titanate.

According to the invention, preferably titanium oxide hydrate particles are used, which after annealing for one hour of a sample pre-dried according to ISO 787 Part 2 at a temperature of 1000° C., have an annealing loss greater than 2 weight %, preferably greater than 6 weight % and/or after annealing for one hour at 500° C. have an annealing loss greater than 0.8 weight %, preferably greater than 1.2 weight %.

Primary particles of the titanium oxide hydrate with an average particle size of 3 to 15 nm, preferably 4 to 8 nm, are obtained by means of the process steps described according to the invention as a result of which, by comparison with conventional gas phase processes, a technically and economically improved production process is provided for the formation of nanoparticulate materials containing titanium oxide hydrate.

The primary particles are small, approximately spherical, microcrystalline particles with a lattice-defective anatase structure. The particle size may be determined by calculation from the BET surface area assuming a monomodal grain size distribution of spherical particles. Assuming a monomodal grain size distribution and spherical particles, the relationship between the average particle size d and the specific surface area SBET (determined according to BET) is given by the equation $$d_{particle} = \frac{6}{\rho \cdot S_{BET}}$$

where $S_{BET}$ is in $m^2/g$, $\rho$=density of the particle in $g/cm^3$, d is in μm. The densities used are: 6.02 $g/cm^3$ (for $BaTiO_2$) 3.90 $g/cm^3$ (for $TiO_2$ as titanium oxide hydrate or anatase), 4.26 $g/cm^3$ (for $TiO_2$ as rutile).

By contrast, significantly coarser particle sizes are determined in an analysis of the particle size by means of scattered light measurements. The values thus determined (approx. 0.5-1.5 μm) are higher than those of $TiO_2$ used according to prior art at approx. 0.25 μm (see comparative example 2).

Surprisingly, it was discovered that the titanium dioxide particles used according to the invention have significant advantages in respect of their suitability for the production of alkaline-earth titanates over conventional titanium dioxide, such as commercially available technical titanium dioxides. Thus, particularly fine-particle alkaline-earth titanates are obtained presumably because of the high specific surface area, the small particle size of titanium oxide hydrate and the high reactivity during reaction with alkaline-earth compounds.

Moreover, the low chloride and carbon content of the titanium oxide hydrate particles according to the invention have a positive effect on the properties of the alkaline-earth titanates. The small content of chloride and metallic trace elements has a favourable effect on the electrical properties of the alkaline-earth titanates produced from the titanium oxide hydrate whilst the low content of carbon ensures that there is no intermediate reduction of $TiO_2$ and no intermediate formation of alkaline-earth carbonates and, therefore, particularly fine-particle alkaline-earth titanates may be obtained. The presence of halides or carbon is disruptive particularly at low reaction temperatures to the alkaline-earth titanate.

1.2 The Alkaline-earth Metal Compound

The titanium dioxide particles are reacted according to the invention with one or a plurality of alkaline-earth metal compounds. Generally speaking, the compounds concerned are salts of one of the alkaline-earth metals magnesium, calcium, strontium and/or barium, if necessary with lead or yttrium added, and/or mixtures thereof. Barium compounds for the production of barium titanate ($BaTiO_3$) are particularly preferred. The salts include carbonates, oxalates, hydroxides, oxides, nitrates, halides such as chlorides, as well as organic compounds such as alkoxides and salts of carbonic acids, such as acetates.

Particularly preferred are oxidic alkaline-earth metal compounds or alkaline-earth compounds which decompose at a temperature below 600° C. (e.g. with formation of alkaline-earth metal oxide). Thus, amongst the barium salts, barium hydroxide, barium nitrate and other easily decomposable barium compounds and mixtures thereof are particularly preferred. Barium carbonate, however, only forms barium oxide at higher temperatures (approx. 1000° C.). Barium oxalate and barium acetate are also less preferred as they initially decompose to barium carbonate.

The decomposition temperatures may, for example, be determined in combined thermogravimetry (TG) and differential thermoanalysis (DTA) apparatus.

1.3 On Controlling the Reaction Process

The titanium dioxide particles characterised previously are used according to the invention in a method for the production of alkaline-earth titanates with the alkaline-earth metal compounds referred to previously. The invention provides in particular two versions of the method:

In the first version according to the invention, the alkaline-earth titanates are obtained by reacting alkaline-earth metal compounds with the titanium dioxide particles defined as in Section 1.1 in a solid state reaction, whereby the reaction takes place at temperatures below 700° C. The reaction temperature is preferably 650° C. or less, even more preferably 600° C. or less. According to the invention, a solid state reaction is understood to be a chemical reaction between two or more solids in the absence of a solvent such as water, for example. This contrasts with wet chemical and also hydrothermal methods in which, for example, solutions containing barium ions are initially produced.

For the first reaction version according to the invention, such alkaline-earth metal compounds as decompose at a temperature below 600° C. are used in particular (e.g. with formation of alkaline-earth metal oxide). Thus, amongst the barium salts, barium hydroxide, barium nitrate and other easily decomposable barium compounds and mixtures thereof are particularly preferred.

The minimum reaction temperature which is necessary for complete reaction to the titanate may be determined by means of DTA. Powder X-ray diffractometry (XRD) is well suited to detecting the completeness of decomposition reactions. Using this method, the crystalline phases are detected and may be determined by comparison with the compounds in databases e.g. JCPDS; the detection limit is around 5%.

A reaction is defined as complete reaction to the alkaline-earth titanate if both the reaction is complete in the DTA and also no other reflexes (peaks) than those of the target compound occur in the XRD. In this regard, if no external reflex exhibits more than 5% of the intensity of the target compound's main reflex, then this is considered as the absence of other reflexes.

Hence the temperature of complete reaction is the lowest temperature at which the reaction has taken place completely as defined by the preceding definition.

It is particularly preferred according to the invention to carry out the reaction at no more than 100° C. (particularly preferred no more than 50° C.) above this minimum reaction temperature.

If barium hydroxide is used (e.g. the octahydrate, the monohydrate or anhydrous barium hydroxide), then the reaction temperature is preferably less than 450° C., in particular preferably between 350° and 450° C. If barium nitrate is used, then the reaction temperature is preferably less than 650° C., in particular preferably between 550° and 650° C.

For the production of alkaline-earth titanates (e.g. $BaTiO_3$), it is possible to dry grind the titanium dioxide particles and the alkaline-earth metal compound (e.g. barium nitrate or barium hydroxide) together and to calcine them subsequently at a temperature below 700° C. (preferably below 600° C.). Alternatively, the titanium dioxide particles and the alkaline-earth metal compound (e.g. barium nitrate or barium hydroxide) may be wet ground together, then dried and subsequently calcined at a temperature below 700° C. (preferably below 600° C.).

Wet grinding lends itself particularly to this if the titanium dioxide particles are already present in the aqueous phase (as suspension). Wet grinding is carried out preferably with mechanically agitated ball mills due to the high specific energy deposit. It may be advantageous to use $ZrO_2$ grinding media to prevent undesirable contamination (particularly Si, Fe and Al) of the material being ground due to abrasion of the grinding medium.

In wet grinding it is not predominantly the primary particle size of the titanium dioxide particles which is improved but their agglomeration state. In particular with very fine-particle titanium dioxide and titanium oxide hydrate primary particles, these are highly agglomerated with the result that the effective size of the agglomerates may be a hundred times the primary particle size. The agglomerate size is normally ascertained by means of scattered light measurements (e.g. with a Malvern Mastersizer such as is generally standard in the field of pigment technology) whilst the primary particle size is determined by electron microscope or by way of BET surface area determinations.

The use of organic additives as dispersing agents may be particularly advantageous. Their presence—particularly during the grinding stage—brings about a significant improvement in the titanium dioxide's agglomerate structure.

When using organic dispersing agents it is also possible to obtain a suspension which is stable against sedimentation and can be used for further processing. The use of ultrasound can also further improve the dispersive state.

It is in particular preferable to add a water soluble barium compound or an aqueous barium salt solution to an aqueous suspension of titanium oxide hydrate and to dry this suspension. Dispersion may take place under the influence of ultrasound. A titanium oxide hydrate is obtained in the process, on the surface of which the alkaline-earth compound is evenly distributed. The titanium oxide hydrate thus obtained and coated with the alkaline-earth metal compound may subsequently be subjected to the solid state reaction, e.g. calcined.

Drying is carried out preferably by means of spray drying. In this manner a homogeneous distribution of the components and particularly easily redispersible drying agglomerates are obtained. Alternatively, drying may take place on the rotary evaporator or by freeze drying.

Thus the invention also provides a powdery preparation containing titanium oxide particles with a BET surface area greater than 50 $m^2/g$ and a water-soluble alkaline-earth compound whereby the mole ratio of titanium and alkaline-earth metal lies between 0.95 and 1.05. Preferably such a preparation is present in dried form. In the production of this preparation as an intermediate product for the titanate it is possible, if necessary, to add doping compounds. Semi-conducting doped alkaline-earth titanates obtained therefrom by calcination are the essential components of temperature-dependent resistors.

It is also possible to carry out drying and calcination in a single process step.

Calcination of the titanium dioxide particles with the alkaline-earth metal compound takes place preferably not isothermally but at an approximately constant conversion rate to the alkaline-earth titanate (SCRT method, described in Gotor et al., J. Europ. Cer. Soc. 23 (2003), 505-513).

Surprisingly, it has also been shown that calcination is possible at a temperature which lies below the temperature at which the pure alkaline-earth metal compound decomposes to the oxide. With regard to the fineness of the titanate obtained, it is possible according to the invention to carry out the calcination at a temperature which is in the range between 50° C. and 200° C. below the temperature at which the alkaline-earth metal compound used decomposes to the oxide.

Following calcination, the alkaline-earth titanate may be further crushed or de-agglomerated by grinding, e.g. bead grinding.

Particularly advantageous at the low calcination temperatures facilitated by the method according to the invention is the low fusion of the alkaline-earth titanate particles obtained. Hence the alkaline-earth titanate particles calcined at low temperatures are particularly easily pulverised or it may even be possible to dispense completely with pulverisation prior to further processing.

In the second reaction version according to the invention, the production of alkaline-earth titanates takes place by reacting alkaline-earth metal compounds with titanium dioxide particles with a BET surface area greater than 50 $m^2/g$, whereby the titanium dioxide particles have a sulphate content <1.5 weight %, a chloride content of <1000 ppm and a carbon content of <1000 ppm. Unlike the first reaction version, it is also possible here to use alkaline-earth metal compounds which only enter into a solid state reaction with the titanium dioxide particles above 600° C. or even 700° C., such as barium carbonate or barium oxalate for example. Furthermore, conversion is not necessarily carried out in the sold state reaction described with regard to the first reaction version but rather it may also be carried out wet chemically or hydrothermally.

Thus, according to this version, the titanium dioxide particles may be reacted with a water-soluble alkaline-earth metal compound (e.g. barium nitrate or barium hydroxide) to alkaline-earth titanate (e.g. $BaTiO_3$), whereby the particles are suspended in the solution containing $Ba^{2+}$ already produced or are suspended together with the Ba salt in water, subsequently the solvent is evaporated and the mixture is calcined at below 600° C.

The alkaline-earth titanate may also be obtained under hydrothermal conditions by reacting the titanium dioxide particles directly with an alkaline-earth compound. Thus, a Ba(OH)$_2$ solution may be reacted with the titanium dioxide particles in an autoclave at pH >13, at a temperature greater than or equal to 100° C. over a period of preferably at least 1 hour whereby barium titanate is obtained directly. For the hydrothermal reaction version, a smaller sulphate content is of particular importance since in this reaction version the formation of the alkaline-earth titanate takes place by way of soluble intermediate stages and thus the presence of sulphate leads to the formation of alkaline-earth sulphates.

In both reaction versions, the volume ratios of alkaline-earth compound to titanium dioxide particles are adjusted by precision weighing. In this regard, the molar ratio Ba:Ti may deviate from 1 according to the barium titanate's precise application requirement.

In particular, it is advantageous for the properties of the alkaline-earth titanate produced according to the present method according to the invention if the mole ratio of niobium to aluminium in the alkaline-earth titanate is 0.5 to 1.5, preferably 0.8 to 1.2, which may be brought about if necessary by adding a corresponding amount of an aluminium compound. Such a material is characterised by particularly good electric properties (e.g. low conductivity).

For example, La, Y, Nb or Sb salts in orders of magnitude from 0.05 to 1.0 mole % in relation to BaTiO$_3$ may be added as doping compounds.

When using alkaline-earth compounds with high decomposition temperature, the advantage of the fine-particle nature of the titanium component is not used optimally: sintering and coarsening of the titanium component has already taken place at the temperatures necessary for decomposition of the alkaline-earth compound. Nevertheless, even when using alkaline-earth compounds which only decompose at high temperatures (e.g. alkaline-earth carbonates), it is possible to achieve a certain improvement in the fine-particle nature of the alkaline-earth titanates by means of fine-particle titanium components (see also Hennings (J. Am. Ceram. Soc. 84 (2001) 2777-2782)).

This applies in particular if the alkaline-earth carbonates are wet ground together with the titanium component as a result of which very homogeneous and reactive mixtures are formed.

1.4 The Alkaline-earth Titanate

The invention provides an alkaline-earth titanate which is obtainable according to the method according to the invention.

The alkaline-earth titanates obtained according to the invention preferably have a BET surface area of 5 to 100 m$^2$/g, in particular preferably 20 to 60 m$^2$/g.

In the unground state, the alkaline-earth titanates obtained according to the invention preferably have a BET surface area greater than 5 to 50 m$^2$/g, in particular preferably 15 to 40 m$^2$/g. The person of average skill in the art can usually differentiate between ground and unground powders by means of electron microscope images. A further criterion for differentiation of ground and unground powders is the ratio of the average particle sizes, which is obtained from the BET surface area and a scattered light determination of the particle size: in ground and de-agglomerated powders, the quotient of the two particle sizes is approximately equal to 1, whilst in unground powders the scattered light method generally results in a substantially larger average particle size than the BET method.

In particular, the alkaline-earth titanates obtained according to the first method according to the invention have no OH groups built into the crystal lattice. The presence of OH groups built into the crystal lattice may be determined by means of IR spectroscopy. Due to the low concentration of the lattice-OH groups, the corresponding IR signals are very weak but characteristic (cf. G. Busca, V, Buscaglia, M. Leoni, P. Nanni, Chem. Mater. 6 (1994) 955-61; D. Hennings, S, Schreinemacher, J. Eur. Ceram. Soc., 9 (1992) 41-46; in addition to H.-P. Abicht, D. Voltzke, A. Roder, R. Schneider, J. Woltersdorf, J. Mater. Chem. 7 (1997) 487-92).

A characteristic band appears around 3500 cm$^{-1}$. By comparison with the very diffuse bands, such as arise from H$_2$O and OH groups adsorbed on the surface, the former are comparatively sharp. This is caused by the specific bonding energy in the lattice in relation to the different bonding possibilities and thus different bonding energies on the surface. This is consistent with a sharply occurring loss of mass in the temperature range just above 400° C. F. Valdivieso, M. Pijolat, C. Magnier, M. Soustelle, Solid State Ionics, 83 (1996) 283-96 specify a temperature for this of 415° C.

The chloride content of the titanate is preferably less than 100 ppm, in particular preferably less than 20 ppm.

The niobium content of the titanate is preferably 10 to 300 ppm, in particular preferably 15 to 100 ppm, even more preferably 15 to 50 ppm.

The mole ratio of aluminium to niobium is preferably between 0.5 and 1.5. The determination of Nb and Al is carried out by means of ICP.

In addition, the alkaline-earth titanate according to the invention preferably contains less than 500 ppm, preferably less than 200 ppm, sulphate.

The alkaline-earth titanate according to the invention preferably contains less than 200 ppm sodium or potassium.

The alkaline-earth titanate according to the invention preferably contains less than 20 ppm iron, preferably less than 5 ppm.

BaTiO$_3$, which has been produced according to the method according to the invention, preferably has a particle size of less than 250 nm.

The alkaline-earth titanate according to the invention preferably has a predominantly tetragonal crystal structure, i.e. of more than 50 weight %, more preferably of more than 70 weight %, even more preferably of more than 90 weight % and in particular preferably of more than 99 weight %, whereby the remainder is cubic alkaline-earth titanate and possibly contaminants. The phase purity of the product according to the invention may be determined by means of powder X-ray diffractometry (XRD), whereby quantitative estimation of the relevant fractions is possible by way of curve fitting.

1.5 Microelectronic Components

The alkaline-earth titanates according to the invention, in particular BaTiO$_3$, may be used for the manufacture of a microelectronic component, e.g. of a capacitive or PTC component. Due to the fine-particle nature of the alkaline-earth titanates obtained, it is possible to realise particularly thin layers and thus particularly small component dimensions. Application in multi-layer ceramic capacitors is a particular consideration where, due to the fine-particle nature of the alkaline-earth titanate according to the invention, it is possible to obtain particularly thin layers (less than 2.5 μm, particularly preferred 0.1 to 1 μm). Such components may be manufactured by producing a slip out of the alkaline-earth titanate, if necessary together with organic additives, and pulling it out into thin films using various methods (spin coating, dip coating, doctor blade method). After adding the alkaline-earth titanates, the PTC components may be pressed into a green compact using a pressing agent, said compact being subsequently sintered.

EXAMPLES

The invention will be explained in greater detail in the following on the basis of a few selected examples whereby the invention is in no way limited to these examples.

Example 1

Barium Titanate from Titanium Oxide Hydrate and Barium Hydroxide 78.87 g $Ba(OH)_2.8H_2O$ (Fluka, p.a.) and 21.95 g titanium oxide hydrate (9 weight % volatile constituents, anatase, BET: 271 $m^2/g$, corresponding to a crystallite size of 6 nm; analytic information in relation to $TiO_2$: 700 ppm S, <20 ppm Cl, 310 ppm Nb, 10 ppm Fe, <0.1% C; FIG. 1 shows the X-ray diffractogram) are placed in a 2 l flask with 1.5 litres of outgassed, distilled water. The mixture is dissolved or suspended whilst stirring for 1 hour at 50° C. Subsequently, the solvent water is removed on the rotary evaporator at 50° C. under vacuum. The powder obtained is dried in the desiccator. The production steps are carried out in a shielding gas atmosphere to prevent the formation of $BaCO_3$ due to the reaction of $Ba(OH)_2$ with $CO_2$ in the air.

Calcination of the powder with formation of $BaTiO_3$ takes places at temperatures T greater than or equal to 360° C. Following heat treatment for 2 hours at 400° C., a product with a specific surface area (determined according to BET) of 27.6 $m^2/g$ is obtained (FIG. 2); following heat treatment for 2 hours at 600° C., a product with a specific surface area (determined according to BET) of 12.8 $m^2/g$ is obtained. In each case, only $BaTiO_3$ is detected as the crystalline phase by means of X-ray diffractometry (XRD). The $BaTiO_3$ crystallite sizes calculated from the specific surface areas are 36 and 78 nm respectively. After tempering at 1000° C. (2 hours), the BET surface area is 3.2 $m^2/g$, corresponding to a crystallite size of 310 nm.

After bead grinding of a 25% suspension of the product calcined at 600° C. (20 minutes discontinuous bead grinding with zirconium silicate grinding beads of 0.4-0.6 mm diameter), the ground and dried barium titanate obtained has a BET surface area of 32.5 $m^2/g$.

Example 2

Barium Titanate Form Titanium Oxide Hydrate and Barium Oxalate 56.34 g $BaC_2O_4$ (manufactured by Alfa Aesar, Karlsruhe) and 21.95 g titanium oxide hydrate (composition as in Example 1) are mixed/ground with 0.313 litres of distilled water and 78 g PVC-coated steel balls for 24 hours in a PVC drum. After suction extraction and drying, the powder mixture is calcined. Temperatures of 950° C. are necessary for a complete reaction of the $BaCO_3$, which forms intermediately from the barium oxalate, with $TiO_2$ with the formation of $BaTiO_3$. After tempering at 1000° C. (2 hours), the BET surface area is 2.8 $m^2/g$; this corresponds to a $BaTiO_3$ crystallite size of 350 nm.

Example 3

Barium Titanate from Titanium Oxide Hydrate and Barium Carbonate 49.34 g $BaCO_3$ (Solvay, Sabed VL 600, Lot No. 325510) and 21.95 g titanium oxide hydrate (composition as in Example 1) are mixed/ground with 0.280 litres of distilled water and 70 g PVC-coated steel balls for 24 hours in a PVC drum. After suction extraction and drying, the powder mixture is calcined. Temperatures of 950° C. are necessary for a complete reaction of the $BaCO_3$ with $TiO_2$ with the formation of $BaTiO_3$. After tempering at 1000° C. (2 hours), the BET surface area is 2.2 $m^2/g$; this corresponds to a $BaTiO_3$ crystallite size of 450 nm.

Example 4

Barium Titanate from Titanium Oxide Hydrate and Barium Nitrate 65.34 g $Ba(NO_3)_2$ (p.a.) and 21.71 g titanium oxide hydrate (8 weight % volatile constituents, anatase, BET: 331 $m^2/g$, corresponding to a crystallite size of 5 nm; 6400 ppm S, <20 ppm Cl, 78 ppm Nb, <10 ppm Fe, <1000 ppm C) are placed in a 2 l flask with 1.0 litre of distilled water. The mixture is dissolved or suspended whilst stirring for 10 minutes at 50° C. Subsequently, the solvent water is removed on the rotary evaporator at 50° C. under vacuum. The powder obtained is oven dried at 120° C.

Calcination of the powder with formation of $BaTiO_3$ takes places at temperatures of 600° C. Following heat treatment for 2 hours at 600° C., a product with a specific surface area (determined according to BET) of 3.6 $m^2/g$ is obtained. $BaTiO_3$ is obtained as the crystalline phase. Following heat treatment for 2 hours at 800° C., a product with a specific surface area (determined according to BET) of 2.7 $m^2/g$ is obtained. $BaTiO_3$ is detected as the only crystalline phase by means of X-ray diffractometry (XRD). The $BaTiO_3$ crystallite sizes calculated from the specific surface areas are 277 and 369 nm respectively.

After tempering at 1000° C. (2 hours), the BET surface area is 1.5 $m^2/g$, corresponding to a crystallite size of 664 nm. After bead grinding, the BET surface areas of all samples are above 5 $m^2/g$.

Surprisingly, the decomposition processes of $Ba(NO_3)_2$ when mixed with $TiO_2$ take place with significantly greater accentuation and clarity than in the pure substance (see FIG. 3). At approx. 600° C., the decomposition is almost completely finished after one step. In contrast, the pure substance does not react completely via the intermediate stage $Ba(NO_2)_2$ until approx. 750° C.

Following calcination of the sample for 2 hours at 600° C., in addition to the crystalline $BaTiO_3$ small quantities of unreacted $Ba(NO_3)_2$ are still found which can be converted completely into the $BaTiO_3$ by lengthening the calcination time. Following calcination at 400° C., only the mixture of the starting materials is present.

Example 5

Compensation of Nb with Different Quantities of Al $BaCO_3$ (Solvay Sabed VL 600) and a titanium oxide hydrate sample (9 weight % volatile constituents, anatase, BET: 316 $m^2/g$, corresponding to a crystallite size of 5 nm; analytical data in relation to $TiO_2$: 2300 ppm S, <20 ppm Cl, 7 ppm Al, 6 ppm Fe, <0.1% C, and with a niobium content of 810 ppm (mass fraction) (corresponding to approx. 0.07 mole %) served as starting materials. Aluminium in the form of the water-soluble salt $Al(NO_3)_3.9H_2O$ was added to compensate the niobium. 148.126 g $BaCO_3$ were ground/mixed for 24 hours with 65.723 g $TiO_2$ and 0.2142 g $Al(NO_3)_3.9H_2O$ in 856 ml distilled water using 213.8 g of plastic-coated steel balls in a ball mill. The grinding medium water was removed from this suspension in the rotary evaporator (approx. 50° C., 60 mbar) with precipitation of the Al component and was subsequently oven dried at 120° C. This was followed by calcination of the mixture for two hours at 1,100° C. The powders obtained therefrom were finely ground for 24 hours using steel balls and four times the amount of water in order to destroy the agglomerates formed during calcination. After suction extraction of the suspension, the powder was dried for 24 hours at 120° C., cooled to room temperature and mixed for 24 hours with a pressing agent (mixture of polyvinyl alcohol, water and glycerine) in the ball mill ("tempering"). This tempered powder was subsequently pressed into tablets (what are known as "green compacts") in a multi-stage procedure. The tablets were then sintered at four different temperatures ranging between 1,250° C. and 1,400° C. The sintered tablets were ground smooth and subsequently provided with an In—Ga alloy on the front face of the tablets. The specific resistance was determined at room temperature. FIG. 5 shows the specific resistance of the ceramics as a function of the degree of compensation.

Example 6

Hydrothermal Reaction of Titanium Oxide Hydrate with Barium Hydroxide 12.62 g (0.04 mole) $Ba(OH)_2.8H_2O$ (p.a. Fluka Chemie GmbH) were placed with 3.51 g titanium oxide hydrate (composition as in Example 1) and 150 ml distilled and outgassed water in a Teflon beaker. The molar Ti/Ba starting ratio was 1.0. Reaction was carried out at 100° C. whilst stirring the reaction mixture in a laboratory autoclave (Berghoff HR 200) with a hold time of one hour. Outgassed, $CO_2$-free water was used in order to prevent possible formation of barium carbonate. A pH value of 13.7 arose with the $BA(OH)_2$/solvent water ratios selected. After the reaction, the solid was suction filtered via a G4 filter frit, washed several times with distilled water until a pH value of pH=9 resulted and subsequently oven dried for 24 hours at 120° C. The reaction product obtained has a specific surface area (according to BET) of 20.7 $m^2/g$ and is unambiguously characterised as $BaTiO_3$ by means of X-ray diffractometry. By using coarse-particle titanium dioxide (highly crystalline rutile, BET: 6 $m^2/g$, as in Comparative Example 1) instead of the titanium oxide hydrate, there is practically no reaction to barium titanate. In the diffractogram only slight references to $BaCO_3$ (at $2\Theta=24°$) and $BaTiO_3$ (at $2\Theta=31.6°$) can be identified in addition to the rutile reflexes.

Comparative Example 1

1.6 Reaction of Coarse Titanium Dioxide with Barium Hydroxide 78.87 g $Ba(OH)_2.8H_2O$ (Fluka p.a.) and 19.98 g titanium dioxide (highly crystalline rutile, BET: 6 $m^2/g$, corresponding to a crystallite size of 250 nm) are placed with 1.5 litres of outgassed, distilled water in a 2 litre flask. The mixture is dissolved or suspended whilst stirring for 1 hour at 50° C. Subsequently, the solvent water is removed on the rotary evaporator at 50° C. under vacuum. The powder obtained is dried in the desiccator. The production steps are carried out in a shielding gas atmosphere to prevent the formation of $BaCO_3$ due to the reaction of $Ba(OH)_2$ with $CO_2$ in the air.

Calcination of the powder takes places at temperatures of approx. 360° C. Following heat treatment for 2 hours at 400° C., a product with a specific surface area (determined according to BET) of 2.5 $m^2/g$ is obtained (see FIG. 4); following heat treatment for 2 hours at 600° C., a product with a specific surface area (determined according to BET) of 2.2 $m^2/g$ is obtained; and following heat treatment for 2 hours at 1000° C., a product with a specific surface area (determined according to BET) of 1.9 $m^2/g$ is obtained.

Unlike Example 1, the main phase after tempering at 400° C. is rutile, along with $Ba_2TiO_4$ and $BaTiO_3$ in addition to reacted or reverse-reacted $Ba(OH)_2H_2O$. There is likewise no complete reaction to $BaTiO_3$ to be ascertained after tempering at 600° C. and 1000° C. Rutile and $Ba_2TiO_4$ occur as subsidiary phases.

Comparative Example 2

1.7 Barium Titanate from Coarse Titanium Dioxide and Barium Carbonate 98.67 g $BaCO_3$ (manufactured by Solvay, Sabed VL 600, Lot No. 325510) and 39.95 g titanium dioxide (highly crystalline rutile, BET: 6 $m^2/g$, corresponding to a crystallite size of 250 nm) are mixed/ground for 24 hours with 0.550 litres of distilled water and 139 g PVC-coated steel balls in a PVC drum. After suction extraction and drying, the powder mixtures are calcined. Temperatures of approx. 950° C. are necessary for complete reaction of the $BaCO_3$ with $TiO_2$ with the formation of $BaTiO_3$. After tempering at 1000° C. (2 hours) the BET surface area is 2.0 $m^2/g$; this corresponds to a $BaTiO_3$ crystallite size of 500 nm.

The invention claimed is:

1. Method for the production of alkaline-earth titanates by reacting alkaline-earth metal compounds with titanium dioxide particles in a solid state reaction, characterised in that the alkaline-earth metal compounds are selected from the group consisting of $Ba(OH)_2$ and compounds that decompose at a temperature below 600° C., and the titanium dioxide particles have a BET surface area greater than 50 $m^2/g$ and the reaction takes place at temperatures below 600° C. in the absence of solvent.

2. Method according to claim 1, characterised in that the alkaline-earth compound is barium hydroxide.

3. Method according to claim 2, characterised in that the reaction takes place at temperatures below 450° C.

4. Method according to claim 1, characterised in that the alkaline-earth compound is barium nitrate.

5. Method according to claim 1, characterised in that the titanium dioxide particles contain less than 1000 ppm halides in relation to $TiO_2$.

6. Method according to claim 1, characterised in that the titanium dioxide particles contain less than 1000 ppm carbon in relation to $TiO_2$.

7. Method according to claim 1, characterised in that the titanium dioxide particles have a sulphate content of less than 1.5 weight %, in relation to $TiO_2$ in each case.

8. Method according to claim 1, characterised in that the titanium dioxide particles contain 10 ppm to 2000 ppm niobium in relation to $TiO_2$.

9. Method for the production of alkaline-earth titanates by reacting alkaline-earth metal compounds with titanium dioxide particles in a solid state reaction at a temperature below 600° C. in the absence of solvent, characterised in that the titanium dioxide particles have a BET surface area greater than 50 $m^2/g$, a sulphate content<1.5 weight % (in relation to $TiO_2$), a chloride content of <1000 ppm and a carbon content of <1000 ppm.

10. Method according to claim 9, characterised in that the titanium dioxide particles have a sulphate content of <0.3 weight % (in relation to $TiO_2$).

11. Method according to claim 9, characterised in that the titanium dioxide particles, in relation to $TiO_2$, contain between 30 ppm and 1000 ppm niobium.

12. Method according to claim 9, characterised in that the titanium dioxide particles are reacted with an alkaline-earth metal compound selected from the group consisting of alkaline-earth carbonate, alkaline-earth hydroxide and alkaline-earth nitrate.

13. Method according to claim 9, characterised in that the titanium dioxide particles are present in the anatase crystal structure.

14. Method according to claim 9, characterised in that the titanium dioxide particles contain less than 100 ppm chloride, in relation to $TiO_2$.

15. Method according to claim 9, characterised in that the BET surface area of the titanium dioxide particles is 200 to 380 $m^2/g$.

16. Method according to claim 9, characterised in that the titanium dioxide particles contain less than 200 ppm sodium and less than 200 ppm potassium in relation to $TiO_2$.

17. Method according to claim 9, wherein the alkaline-earth titanates further comprise a niobium and aluminium dopant.

18. Method according to claim 17, wherein the niobium content is 10 to 300 ppm, of the alkaline-earth titanate, and the mole ratio of aluminium to niobium is between 0.5 and 1.5.

19. Method according to claim 9, wherein the alkaline-earth titante is $BaTiO_3$, characterized by a particle size of less than 250 nm.

\* \* \* \* \*